Oct. 10, 1967 H. A. KRUGER 3,346,440

PATCHING MEANS FOR RESTORING PUNCHED CARD FIELD

Filed Aug. 14, 1964 2 Sheets-Sheet 1

INVENTOR.
HERBERT A. KRUGER
BY Elmer M. Edwards
AGENT

Oct. 10, 1967 H. A. KRUGER 3,346,440

PATCHING MEANS FOR RESTORING PUNCHED CARD FIELD

Filed Aug. 14, 1964 2 Sheets-Sheet 2

INVENTOR.
HERBERT A. KRUGER
BY Elmer M. Edwards
AGENT

United States Patent Office 3,346,440

Patented Oct. 10, 1967

3,346,440

PATCHING MEANS FOR RESTORING PUNCHED CARD FIELD

Herbert A. Kruger, Etobicoke, Ontario, Canada, assignor to Kimball Systems Ltd.

Filed Aug. 14, 1964, Ser. No. 389,705
3 Claims. (Cl. 156—583)

The present invention relates to a patch affixing device for tabulating cards and more particularly to means for heat sealing a sheet patch to an erroneously punched document, such as a punch card for instance of the type utilized at gasoline dispensing stations, whereby to reconstitute such card for a repunching operation with the correct information.

In the past it has been the practice to repair cards of this sort, when a hole is punched therein at the wrong place, by adhering a small patch of material, such as pressure sensitive Mylar, to the rear of the card. The affixing of a small patch to the rear of an improperly punched hole has been very troublesome, however, for a number of reasons. Such small patches cut to the dimension desired are very difficult to handle and to affix properly for completely covering the improperly punched hole. Also, where a number of holes are punched in the card it is difficult to recognize the improperly punched hole from the rear and in some cases the patch would improperly be affixed to a correctly punched hole, leaving the incorrectly punched hole unpatched.

Attempts have been made to overcome such difficulties by providing a view plate spaced aligner locator and an applicator means adapted to receive a card so that the rear of the card is adjacent the applicator while the face of the card is adapted to cooperate with the view plate locator, as in the manner set forth in U.S. Patent 2,295,903 issued Sept. 15, 1942, to David C. K. Kennedy. Such a device for operation however consumes a considerable amount of the operator's time, since a card must be sighted and manually adjusted to a separate precise position each time and with each erroneously punched hole of a field requiring patching individually With the foregoing in view, it is an object of the present invention to provide means for sealing a sheet patch in manner to cover at one time a complete field of information as previously punched within a record card.

Further, the invention provides extremely simple and compact means for expeditiously heat sealing such a sheet patch to the rearward surface of a card.

As another object the invention contemplates dry adhesive patching of a previously punched card to recondition in one operation the entire card for repunching operations.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

Figure 1:
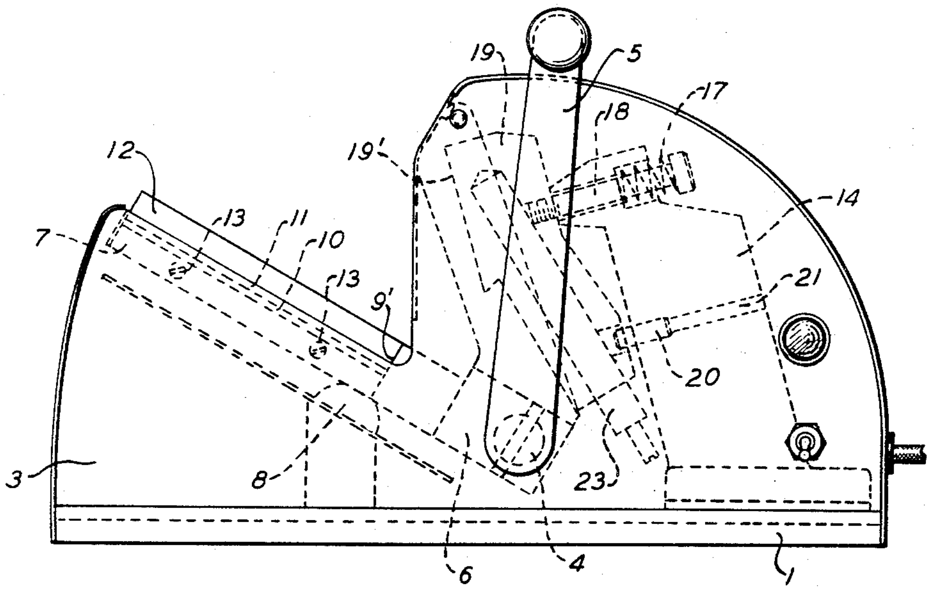
FIG. 1 is a side elevational view of a manually operable machine embodying the present invention, showing the platen thereof in the normal lower unactuated position for the reception of a card and patch sheet to be installed thereon.
Figure 2:
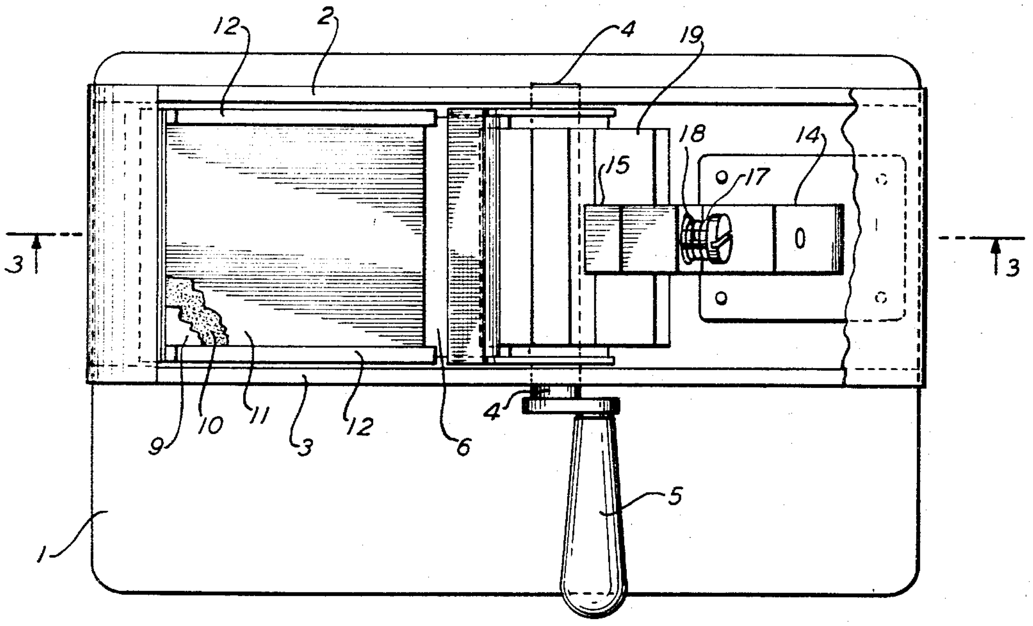
FIG. 2 is a top plan view of the machine.

Referring now to the drawings, the reference numeral 1 designates the main base plate of the machine, on which are mounted spaced left and right side plates 2 and 3 respectively. Suitably bearinged within said plates is a transverse rock shaft 4, the rightward end of which extends beyond plate 3 and to which is secured a hand operating lever 5. Said lever in the normal unactuated condition being in substantially a vertical position.

Figure 4:
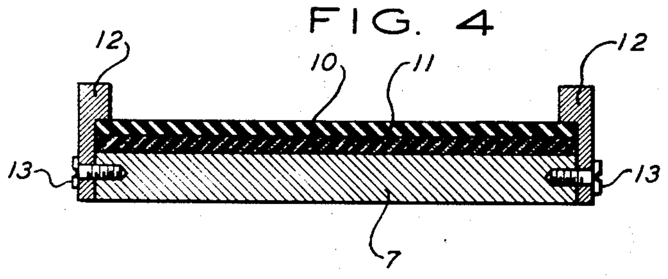
FIG. 4 is an enlarged sectional view of the platen taken as indicated by line 4—4 of FIG. 3.

Pinned to shaft 4 for rocking operation therewith is a platen 6 comprising a plate member 7 normally in one extreme position thereof extending forwardly and upwardly in an angular relation to base 1, while resting upon suitable resilient stop buttons 8, as shown in FIG. 1. The distal end of plate 7 includes a plane surface 9 terminating at the inward end thereof coincident with a shouldered portion 9′ of said plate. Upon surface 9 are superimposed two mats 10, 11 respectively of elastomeric resilient rubber, or the like, and being held thereon by suitable flanged guide members 12, secured along the sides of plate 7 by means of screws 13 (FIG. 4). Bottom mat 10 is more flexible or yieldable than the uppermost mat 11 and may for example be of soft silicone sponge rubber; while the upper mat 11 is of heat resistant material such as silicone rubber but less resilient or yieldable than the lower mat 10.

Figure 3:
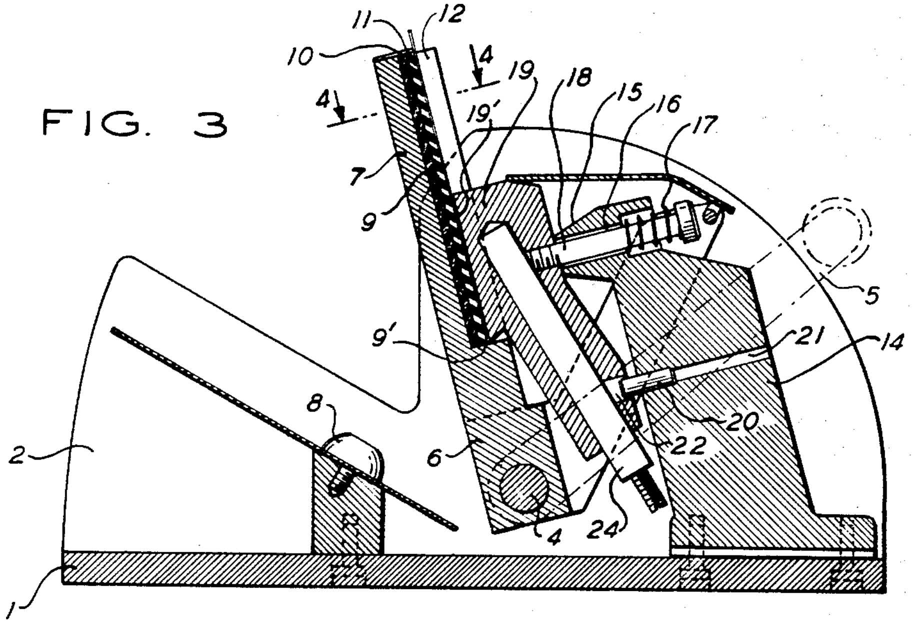
FIG. 3 is an end elevational view taken along the line 3—3 of FIG. 2 and showing the parts in heat sealing operated position.

Secured to the rearward portion of base plate 1 is a pedestal 14 of the uniform cross section shown in FIG. 3. The upper end of said pedestal includes a tapered nose portion 15 having a central orifice 16 therein the rearward end being of enlarged diameter for receiving a compression spring 17. Extending through spring 17 and orifice 16 is a bolt 18 threaded at the lower forward end thereof and provided with an enlarged head portion for engagement with spring 17. Bolt 18 is of slightly smaller diameter to orifice 16 and when screwed within a suitable heat transmitting anvil 19 serves to mount said anvil to pedestal 14 in resilient manner. Thus as platen 7, in the manner and purpose to be described, is swung upwardly for engagement with anvil 19 a limited amount of adaptibility is permitted to the anvil about nose 15. This is desirable so that accurate face-to-face parallel relation may be obtained between platen 7 and a heating face 19′ of anvil 19, thereby insuring that there will be uniform heat sealing throughout the entire card-patch interface during a patching operation. To insure anvil 19 against pivoting around bolt 18 a suitable dowel pin 20 is pressed within an orifice 21 of pedestal 14 and extends into a suitable recess 22 of said anvil.

Anvil 19 is provided with three parallel blind bores extending upwardly therein from its lower end. The two outer bores each receive a removable electrical heating element 23 (FIG. 1), frictionally held, or secured by other suitable means, therein for heating face 19′ of anvil 19 to a desired temperature in accordance with the setting of a removable adjustable thermostat 24 (FIG. 3), frictionally inserted within the central bore located between said outer bores.

Figure 5:
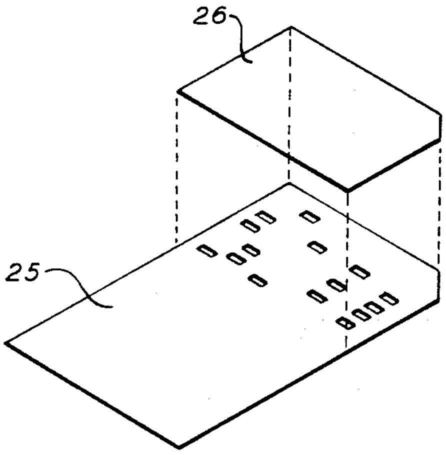
FIG. 5 is a perspective showing a card and the patch to be applied thereto.

It will be recalled from the earlier brief description that an intended application of the invention is for heat sealing a sheet patch to an erroneously punched document such as a punch card, so as to permit the document to be repunched with the correct information. FIG. 5 shows such a card 25 and the patch 26 to be applied thereto. One side of the patch has a coating of heat-activatable adhesive which is nontacky at normal ambient temperatures. For patching, a card 25 and the adhesive coated patch 26 are placed between guides 12 in that order, on the surface 9 of the platen 7 with each by virtue of the incline thereof being easily aligned against shoulder 9′ of said platen.

The machine having first been plugged to a convenient electrical outlet, handle 5 is now rocked rearwardly by the operator in a manual operation to swing the platen 7 therewith and thus carrying the card and patch so that the patch is pressed against the heated face 19' of anvil 19. The adhesive is thereby rendered active, whereby the patch is heat sealed to the punched portion of the card. The handle 5 is then released and it is intended that in the extreme operated angular position shown in FIG. 3 the platen will return by gravity to its normal position against stop 8 shown in FIG. 1. The patched card may now be lifted off the platen 7 and is now in condition to be repunched. However, it is not necessary to lift every individual patched card off the platen since experience has shown that an operator can patch as many as five or six cards before lifting them off the platen.

Although the invention has been shown and described in relation to a hand-operated machine it is obvious that operating shaft 4 if desired could be driven by power means, such as an electric motor, in the usual well-known manner.

While there has been shown and described a preperred embodiment of the present invention, it will be obvious that changes in form and details of the device may be made by those skilled in the art, and it is, therefore, contemplated to cover by the appended claims any such modifications as fall within the true spirit and scope of the invention.

What I claim is:

1. A heat sealing apparatus for applying a sheet patch having a heat activatable coating to a record card for covering an area on the card given to punched information; comprising a platen normally inclined from horizontal condition for facilitating the placement of a card and sheet patch thereon;

a raised stop guide on said platen for limiting said card and sheet patch to a given position thereon;

a mat supported upon said platen and comprising a first thickness of resilient material with a second thickness thereof made of heat resistant material;

a heat transmitting means having a contact face engageable with the patch card in an operated position of said platen for heat sealing said patch to said card;

means including a unitary adjustable member for mounting said heat transmitting means and adapted for automatically aligning said contact face wtih said patch card in the said operated position; and operating means for effecting a reciprocatory operation of said platen including a rotatable crank arm.

2. The invention according to claim 1; and a pedestal providing self-aligning support for said heat transmitting anvil, said pedestal having an orifice in the upper portion thereof for receiving said unitary adjustable member and terminating at one end in an enlarged recess portion;

a compression spring mounted within said recess portion;

a bolt secured within said anvil and extending with smaller diameter clearance through said orifice and said spring, said bolt having an enlarged head portion for securing said spring; and cooperating pin and recess means between said pedestal and said anvil to confine restricted movement of said anvil about said pedestal.

3. The invention according to claim 2; and said anvil including a pair of spaced recesses for removably mounting therein electric heating elements; and a recess intermediate said spaced recesses for removably mounting therein a heat control thermostat for said electric heating elements.

References Cited

UNITED STATES PATENTS

| | | | |
|---|---|---|---|
| 2,202,314 | 4/1940 | Krueger | 156—583 |
| 2,535,642 | 12/1950 | Liebowitz | 156—580 |
| 3,035,951 | 5/1962 | Braun et al. | 156—583 |

EARL M. BERGERT, *Primary Examiner.*

DOUGLAS J. DRUMMOND, *Examiner.*